United States Patent [19]

Blackburn et al.

[11] 4,093,055

[45] June 6, 1978

[54] TORQUE-TRANSMITTING, TORQUE SENSING SYSTEM

[75] Inventors: James R. Blackburn; Dudley C. Smith, both of Dallas, Tex.

[73] Assignee: John E. Mitchell Company, Dallas, Tex.

[21] Appl. No.: 742,002

[22] Filed: Nov. 15, 1976

[51] Int. Cl.² .............................................. F16D 67/00
[52] U.S. Cl. .................................. 192/116.5; 192/108; 192/150; 62/136; 64/29
[58] Field of Search ...................... 192/150, 108, 116.5; 64/29; 62/136; 73/54 T

[56] References Cited

U.S. PATENT DOCUMENTS

| | | | |
|---|---|---|---|
| 1,163,085 | 12/1915 | Hardy | 192/108 |
| 1,352,293 | 9/1920 | Lovell | 192/108 |
| 1,386,139 | 8/1921 | Stockdale et al. | 192/108 |
| 2,174,342 | 9/1939 | Greulich | 64/29 |
| 2,291,407 | 7/1942 | Paul | 64/29 |
| 2,597,140 | 5/1952 | Versnel | 192/150 |
| 3,108,449 | 10/1963 | Lents | 62/136 |

Primary Examiner—John J. Camby
Assistant Examiner—Henry C. Yuen
Attorney, Agent, or Firm—Rogers, Eilers & Howell

[57] ABSTRACT

A torque-transmitting, torque-sensing system has a first rotatable shaft which can be shifted radially in two orthogonally-displaced directions to be precisely concentric with a second rotatable shaft, has a first coupling element which is rotatable with but which is movable axially relative to one of those rotatable shafts, has a biasing means which urges the first coupling element for movement axially in one direction relative to the one rotatable shaft, has a second coupling element which is rotatable with the other rotatable shaft, and has a surface on one of those coupling elements which coacts with a complementary surface on the other of those coupling elements to enable those coupling elements to transmit torque from that rotatable shaft which is the driving shaft to that rotatable shaft which is the driven shaft while permitting the first coupling element to respond to a predetermined increase in rotation resistance of the driven shaft to move axially in the opposite direction relative to the one rotatable shaft.

18 Claims, 16 Drawing Figures

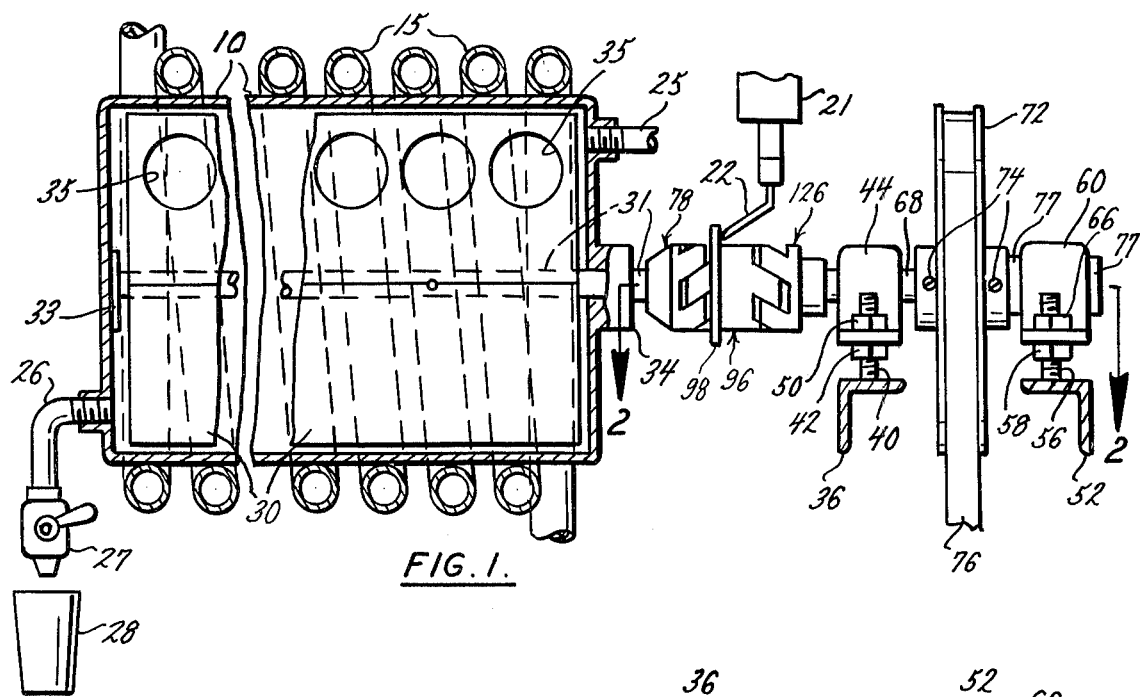
FIG. 1.
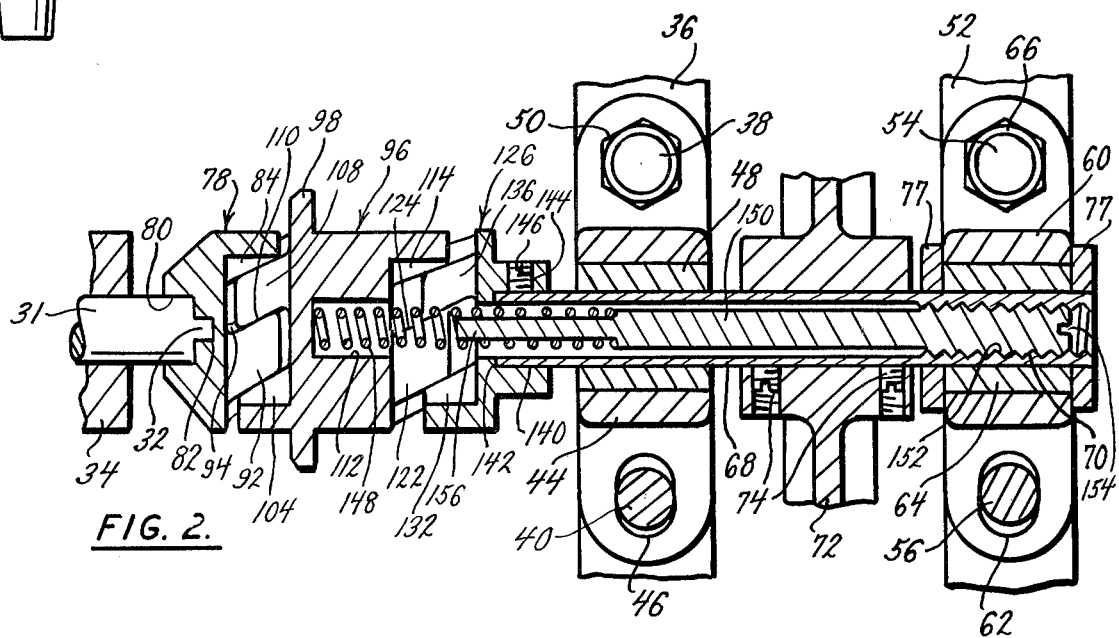
FIG. 2.
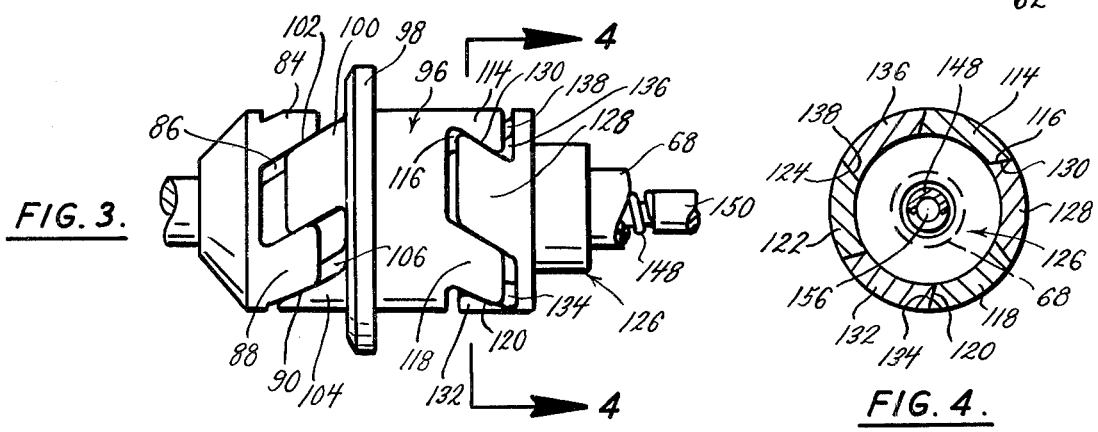
FIG. 3.
FIG. 4.

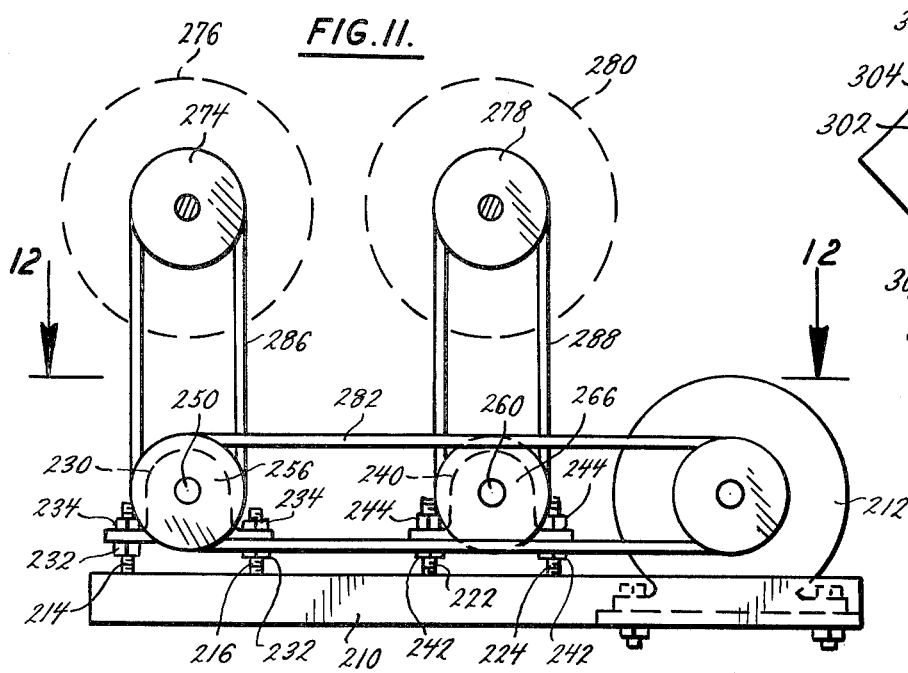
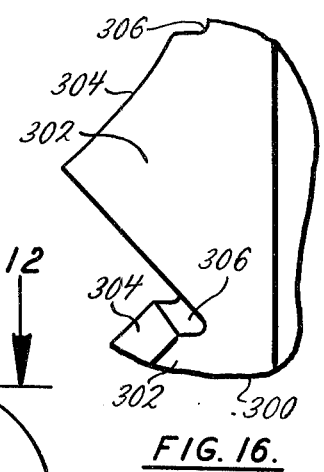
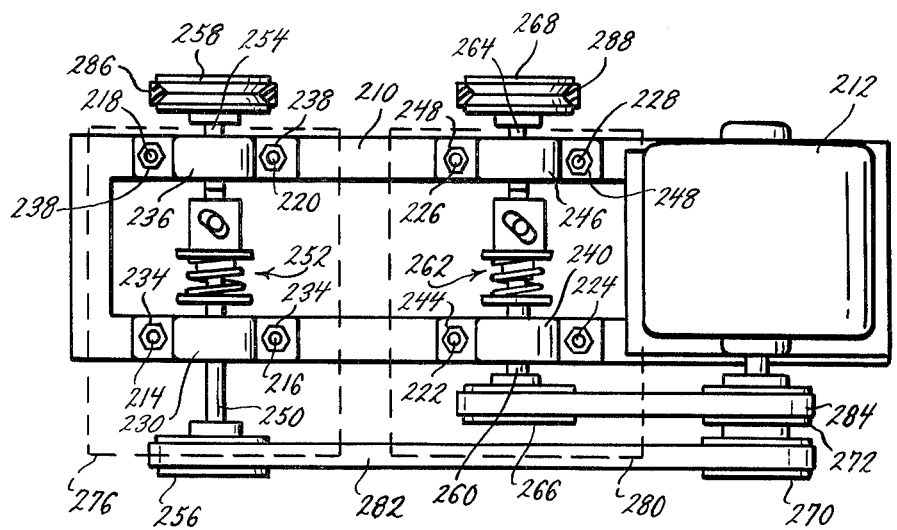
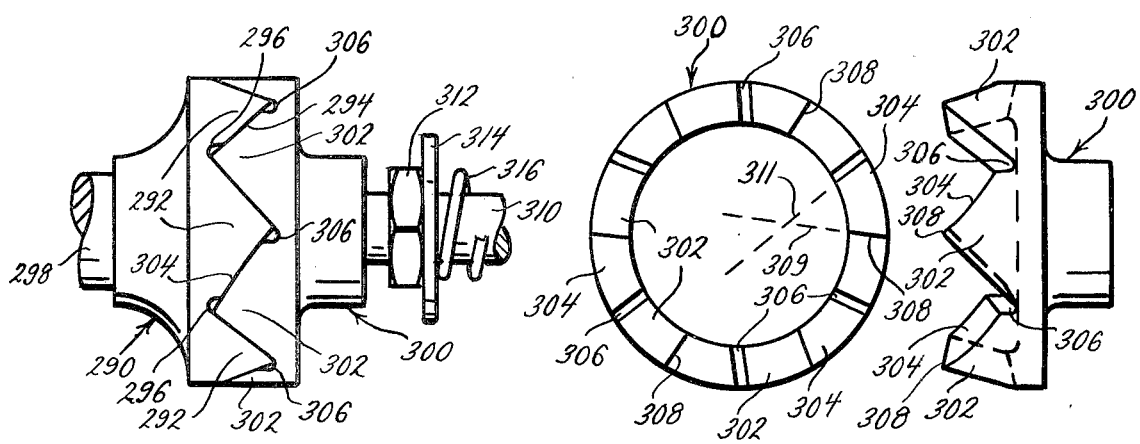

TORQUE-TRANSMITTING, TORQUE SENSING SYSTEM

BACKGROUND OF THE INVENTION

When an agitator is used in making a product, which initially has a low viscosity but which subsequently develops a higher viscosity, that product can provide a progressively-increasing resistance to the movement of that agitator. In Lents U.S. Pat. No. 3,108,449 for Machine For Making An Icy Product With Torque Sensitive Control, which was granted on Oct. 29, 1963, a rotatable agitator easily stirs a mixture of syrup and carbonated water until that mixture begins to freeze. The resulting increase in the viscosity of that mixture provides a progressively-increasing resistance to the rotation of that agitator within that mixture; and that progressively-increasing resistance to rotation causes a coupling element to shift out of its initial position. The shifting of that coupling element is sensed by a switch which de-energizes a refrigeration compressor to keep the mixture of syrup and carbonated water from becoming a solid frozen mass. As the temperature of that mixture subsequently increases, with a consequent decrease in the viscosity of that mixture, the coupling element will shift back toward its initial position, and thereby enable the switch to reenergize the refrigerant compressor.

SUMMARY OF THE INVENTION

A torque-transmitting, torque-sensing system has a first rotatable shaft which is held against axial shifting relative to a second rotatable shaft. However, that first rotatable shaft is mounted in bearings which can be shifted radially in two orthogonally-displaced directions to dispose the axis of that first rotatable shaft so it is precisely concentric with the axis of that second rotatable shaft. In this way, all possible misalignments between the two rotatable shafts can be avoided. It is, therefore, an object of the present invention to provide a torque-transmitting, torque-sensing system which has a first rotatable driving shaft that is held against axial shifting relative to a second rotatable shaft but that is mounted in bearings which can be shifted radially in two orthogonally-displaced directions to dispose the axis of that first rotatable shaft so it is precisely concentric with the axis of that second rotatable shaft.

The bearings of the torque-transmitting, torque-sensing system of the present invention are held by bearing blocks which have elongated slots therein; and those elongated slots telescope over, but can easily be shifted radially and axially of, threaded studs. Nuts, that are threaded onto those threaded studs, underlie and overlie slot-defining portions of those bearing blocks; and those nuts can be shifted axially of those threaded studs to shift those bearing blocks axially of those threaded studs, and also can be loosened and tightened to provide any desired shifting of those bearing blocks radially of those threaded studs. It is, therefore, an object of the present invention to provide a torque-transmitting, torque-sensing system with bearing blocks which have elongated slots therein that telescope over, but can easily be shifted radially and axially of, threaded studs.

The torque-transmitting, torque-sensing system of the present invention has a first coupling element which is rotatable with but which is movable axially relative to one of those rotatable shafts, has biasing means which urges the first coupling element for movement axially in one direction relative to the one rotatable shaft, has a second coupling element which is rotatable with the other rotatable shaft, and has a surface on one of those coupling elements which coacts with a complementary surface on the other of those coupling elements to enable those coupling elements to transmit torque from that rotatable shaft which is the driving shaft to that rotatable shaft which is the driven shaft while permitting the first coupling element to respond to a predetermined increase in rotation resistance of the driven shaft to move axially in the opposite direction relative to the one rotatable shaft. As long as the rotation resistance of the driven shaft is small, the biasing means will hold the first coupling element in an initial position relative to the one rotatable shaft; but, as that rotation resistance increases, that first coupling element will shift out of that initial position. Subsequently, when that rotation resistance decreases, the biasing means will move that first coupling element back toward its initial position. It is, therefore, an object of the present invention to provide a torque-transmitting, torque-sensing system with a first coupling element which is rotatable with, but which is biased for movement axially relative to, a rotatable shaft to cause a second coupling element to rotate, but which responds to increased rotation resistance of the second rotatable element to move in the opposite direction axially of the first rotatable shaft.

The coupling elements, of one embodiment of the torque-transmitting torque-sensing system of the present invention, have fingers thereon which engage each other to transmit torque. Those fingers must permit relative axial movement of those coupling elements while they continue to transmit torque. The fingers on one of those coupling elements are spaced apart circumferentially; and the correspondingly-spaced fingers on the other of those coupling elements extend into the spaces between the fingers on that one coupling element. Driving surfaces on the fingers of the one coupling element engage complementary driven surfaces on the fingers of the other coupling element; and those driving and driven surfaces have generally-helical configurations which minimizes wear of those surfaces, and also provide centering forces that tend to hold those coupling elements concentric with each other. It is, therefore, an object of the present invention to provide coupling elements, for a torque-transmitting, torque-sensing system, which have interfitted fingers that have interacting surfaces with generally-helical configurations.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose and illustration only and do not limit the invention and that the invention will be defined by the appended claims.

BRIEF DESCRIPTION OF THE DRAWING

In the drawing,

FIG. 1 is a side elevational view of one preferred embodiment of torque-transmitting, torque-sensing system which is provided by the present invention and which is shown supplying power to an agitator within a partially broken-away, partially-sectioned container, FIG. 2 is a sectional view, on a larger scale, through the torque-transmitting, torque-sensing system of FIG. 1, and it is taken along the plane indicated by the line 2—2 in FIG. 1, FIG. 3 is a side elevational view, on the scale of FIG. 2, of the coupling elements of the torque-transmitting, torque-sensing system of FIG. 1, but it shows the central coupling element in its right-hand position, FIG. 4 is a sectional view, on the scale of FIG. 2, through the torque-transmitting, torque-sensing system of FIG. 1, and it is taken along the plane indicated by the line 4—4 in FIG. 3, FIG. 11 is an end elevational view of two torque-transmitting, torque-sensing couplings for two refrigerated containers, FIG. 12 is a plan view of the torque-transmitting, torque-sensing couplings of FIG. 11, FIG. 13 is a side elevational view of a further torque-transmitting, torque-sensing coupling provided by the present invention, FIG. 14 is an end elevational view of one of the coupling elements of FIG. 13, FIG. 15 is a side elevational view of the coupling element of FIG. 14, and FIG. 16 is a side elevational view, on a larger scale, of part of the coupling element of FIG. 14.

DESCRIPTION OF THE PREFERRED EMBODIMENTS

Figure 5:
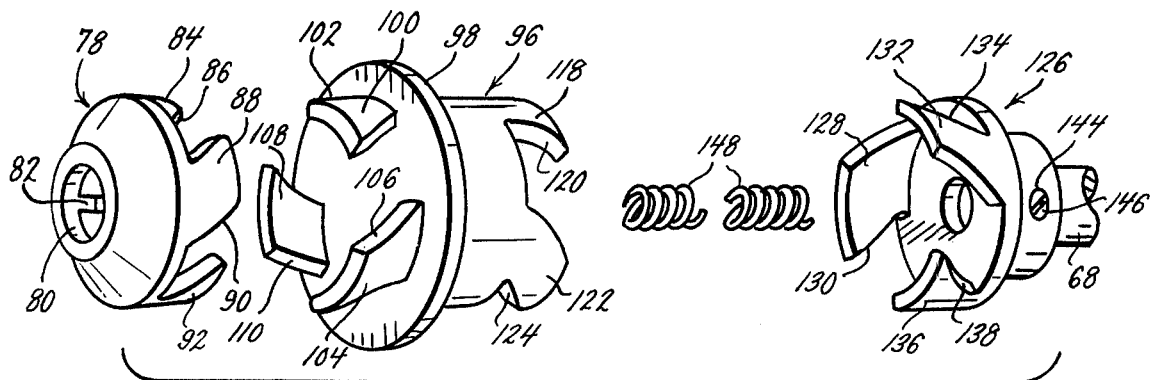
FIG. 5 is an exploded view of the coupling elements of the torque-transmitting, torque-sensing system of FIG. 1.

Referring to FIGS. 1-15 in detail, the numeral 10 denotes a refrigerated container and the numeral 15 denotes a coil through which refrigerant can flow to absorb heat from the container 10 and its contents. The numeral 21 denotes a switch that has an actuating arm 22; and that switch controls the energization and de-energization of a refrigeration compressor, not shown. The numeral 25 denotes an inlet for the container 10, and the numeral 26 denotes an outlet for that container. A spigot or other discharge valve 27 is secured to that outlet; and a cup 28 is shown in position below that spigot. The numeral 30 denotes an agitator paddle or blade which is secured to, and which rotates with, a shaft 31 that is journalled in bearings 33 and 34 at the opposite ends of the container 10. Holes 35 are provided in that blade, as shown particularly by FIG. 1. The hereinbefore-identified elements can, and preferably will, be identical to the similarly-numbered elements in the said Lents patent.

The numeral 32 denotes a tongue which is provided on that end of the shaft 31 which projects outwardly from the bearing 34; and that tongue is rectangular in end view. The numeral 36 denotes an angle iron portion of a supporting frame; and the numerals 38 and 40 denote threaded studs which are secured to, and which extend upwardly from, that angle iron portion. Nuts 42, one of which is shown in FIG. 1, are threaded onto the threaded studs 38 and 40. The numeral 44 generally denotes a bearing block with end-wise-extending portions that have elongated slots 46 therein; and one of those elongated slots is shown in FIG. 2. Those elongated slots telescope downwardly over the threaded studs 38 and 40; and the endwise extending portions of the bearing block 44 will be underlain by the nuts 42. The elongated slots 46 permit shifting of that bearing block in a horizontal plane and in a direction at right angles to the axis of the shaft 31. A sleeve bearing 48 is disposed within, and is held by, the bearing block 44. Nuts 50 are threaded onto the threaded studs 38 and 40, and they overlie the endwise-extending portions of that bearing block. Appropriate setting of the nuts 42 and 50 along the axes of the threaded studs 38 and 40 provides appropriate vertical positioning of the bearing block 44 relative to the axis of the shaft 31. Appropriate shifting of the elongated slots 46 radially of the threaded studs 38 and 40 provides appropriate horizontal positioning of that bearing block relative to that axis. All of this means that by appropriately setting the nuts 42 and 50, the axis of the sleeve bearing 48 can be set at the exact level of the axis of the shaft 31; and that by shifting the elongated slots 46 radially of the threded studs 38 and 40 and then tightening the nuts 50, the axis of the sleeve bearing 48 can be set precisely concentric with the axis of that shaft.

The numeral 52 denotes a further angle iron portion of the supporting frame; and threaded studs 54 and 56 are secured to, and extend upwardly from, that angle iron portion. Nuts 58 are threaded onto those threaded studs; and one of those nuts is shown in FIG. 1. The numeral 60 generally denotes a bearing block which preferably is identical to the bearing block 44. Endwise-extending portions of the bearing block 60 have elongated slots 62 therein which telescope downwardly over the threaded studs 54 and 56; and one of those elongated slots is shown in FIG. 2. A sleeve bearing 64 is disposed within, and is held by, the bearing block 60. Nuts 66 are threaded onto the threaded studs 54 and 56, and those nuts overlie, while the nuts 58 underlie, the endwise-extending portions of that bearing block. Appropriate settings of the nuts 58 and 66 along the axes of the threaded studs 54 and 56 provides appropriate vertical positioning of the bearing block 60 relative to the axis of the shaft 31. Appropriate shifting of the elongated slots 62 radially of the threaded studs 54 and 56 provides appropriate horizontal positioning of that bearing block relative to that axis. All of this means that by appropriately setting the nuts 58 and 66, the axis of the sleeve bearing 64 can be set at the exact level of the axis of the shaft 31; and that by shifting the elongated skots 62 radially of the threaded studs 54 and 56 and then tightening the nuts 66, the axis of the sleeve bearing 64 can be set precisely concentric with the axis of that shaft.

The numeral 68 denotes an elongated hollow shaft which is rotatably mounted within the sleeve bearings 48 and 64. Because the axes of those sleeve bearings are precisely concentric with the axis of the shaft 31, the axis of the elongated hollow shaft 68 also is precisely concentric with the axis of the shaft 31. The numeral 70 denotes an internal thread at the right-hand end of that elongated hollow shaft.

The numeral 72 denotes a pulley which is telescoped over the elongated hollow shaft 68 and which is located intermediate the bearing blocks 44 and 60. Set screws 74 are seated within threaded sockets in the hub of that pulley; and those set screws bear against the elongated hollow shaft 68 to fixedly secure that pulley to that elongated hollow shaft. The numeral 76 denotes a belt, which preferably will be a V-belt, that passes around the pulley 72 and that also passes around a pulley, not shown, on the output shaft of a motor, not shown. The belt 76 and the pulley 72 will respond to energization of that motor to rotate the elongated hollow shaft 68 in the clockwise direction, as that elongated hollow shaft is viewed from the right-hand end thereof in FIGS. 1 and 2. Locking collars 77, of standard and usual design, are fixedly mounted on, and rotate with, the elongated hollow shaft 68. Those locking collars are immediately adjacent the opposite ends of the sleeve bearing 64 in the bearing block 60; and that sleeve bearing will coact with those locking collars to prevent axial shifting of that elongated hollow shaft.

The numeral 78 generally denotes a coupling element which preferably is made from a tough plastic material that has a smooth surface; and one such plastic material is sold under the mark DELRIN. That coupling element has a generally-cylindrical recess 80 in the left-hand end thereof to accommodate the right-hand end of the shaft 31. A rectangular recess 82 extends inwardly from the inner end of the cylindrical recess 80; and that rectangular recess can receive the rectangular tongue 32 on the right-hand end of the shaft 31. The engagement between the rectangular recess 82 and the rectangular tongue 32 is easy enough to permit ready introduction of that tongue into that recess; but it is close enough to enable rotation of the coupling element 78 to enforce rotation of the shaft 31.

Fingers 84, 88 and 92 are provided at the right-hand face of the coupling element 78; and the outer surfaces of those fingers define an interrupted cylindrical surface which projects from that right-hand face. Those fingers have the center lines thereof circumferentially spaced apart one hundred and twenty degrees; and those center lines are displaced forty-five degrees from the axis of that coupling element. The finger 84 has a generally-helical driven surface 86 thereon, the finger 88 has a generally-helical driven surface 90 thereon, and the finger 92 has a generally helical driven surface 94 thereon. Each of those generally-helical driven surfaces is about one half of an inch long. Each long, that is defined by the right-hand end of any of the generally-helical driven surfaces 86, 90 and 94 and that lies in the plane which is defined by the right-hand end of the fingers 84, 88 and 92, will pass to one side of the axis of the coupling element 78; whereas each line that is defined by the left-hand end of any of those generally-helical driven surfaces will pass on the opposite side of that axis. This means that each of the generally-helical driven surfaces 86, 90 and 94 will have at least one line thereof extending radially of the axis of the coupling element 78 but will have lines adjacent the opposite ends thereof which pass on opposite sides of that axis.

The numeral 96 generally denotes a coupling element which has a cylindrical body portion and which has a generally-flat, annular, flange-like portion 98 that extends outwardly from that body portion. A cylindrical socket 112 is provided in the right-hand face of that body portion, as shown by FIG. 2. Fingers 100, 104 and 108 project to the left from the body portion of the coupling element 96, as shown particularly by FIGS. 2, 3 and 5; and the outer surfaces of those fingers define an interrupted cylindrical surface. Those fingers have the center lines thereof circumferentially spaced apart 120°; and those center lines are displaced 45° from the axis of that coupling element. A generally-helical driving surface 102 is formed on the finger 100, a generally-helical driving surface 106 is formed on the finger 104, and a generally-helical driving surface 110 is formed on the finger 108. Each of those generally-helical driving surfaces is about one half of an inch long. Each lne, that is defined by the left-hand end of any of the generally-helical driving surfaces 102, 106 and 110 lies in the plane which is defined by the left-hand ends of the fingers 100, 104 and 108, will pass to one side of the axis of the coupling element 96, whereas each line that is defined by the right-hand end of any of those generally-helical driven surfaces and that lies in the plane which is defined by the right-hand ends of those fingers will pass on the opposite side of that axis. This means that each of the generally-helical driving surfaces 102, 106 and 110 will have at least one line thereof extending radially of the axis of the coupling element 96 but will have lines adjacent the opposite ends thereof which pass on opposite sides of that axis.

Fingers 114, 118 and 122 project to the right from the body portion of the coupling element 96, as shown particularly by FIGS. 2, 3 and 5; and the outer surfaces of those fingers define an interrupted cylindrical surface. Those fingers have the center lines thereof circumferentially spaced apart 120°; and those center lines are displaced 45° from the axis of that coupling element. A generally-helical driven surface 116 is provided on the finger 114, a generally-helical driven surface 120 provided on the finger 118, and a generally-helical driven surface 124 is provided on the finger 122. Each of those generally-helical driven surfaces is about one half of an inch long. Each line, that is defined by the right-hand end of any of the generally-helical driven surfaces 116, 120 and 124 and that lies in the plane which is defined by the right-hand ends of the fingers 114, 118 and 122 will pass to one side of the axis of the coupling element 96; whereas each line that is defined by the left-hand end of any of those generally-helical driven surfaces and that lies in the plane which is defined by the left-hand ends of those fingers will pass on the opposite side of that axis. This means that each of the generally-helical driven surfaces 116, 120 and 124 will have at least one line thereof extending radially of the axis of the coupling element 96 but will have lines adjacent the opposite ends thereof which pass on opposite sides of that axis. The coupling element 96 preferably is made from a tough plastic material that has a smooth surface.

The numeral 126 generally denotes a coupling element which preferably is made from a tough plastic material that has a smooth surface. That coupling element has a passage 140 through the geometric center thereof; and a shoulder 142 is provided adjacent the left-hand end of that passage, as shown particularly by FIG. 2. Fingers 128, 132 and 136 project to the left from the coupling element 126, as shown particularly by FIGS. 2, 3 and 5; and the outer surfaces of those fingers define an interrupted cylindrical surface. Those fingers have the center lines thereof circumferentially spaced apart 120°; and those center lines are displaced 45° from the axis of that coupling element. A generally-helical driving surface 130 is provided on the finger 128, a generally-helical driving surface 134 is provided on the finger 132, and a generally-helical driving surface 138 is provided on the finger 136. Each of those generally-helical driving surfaces is about one half of an inch long. Each line, that is defined by the left-hand end of any of the generally-helical driving surfaces 130, 134 and 138 and that lies in the plane which is defined by the left-hand ends of the fingers 128, 132 and 136, will pass to one side of the axis of the coupling element 126, whereas each line that is defined by the right-hand end of any of those generally-helical driven surfaces and that lies in the plane which is defined by the right-hand ends of those fingers will pass on the opposite side of that axis. This means that each of the generally-helical driving surfaces 130, 134 and 138 will have at least one line thereof extending radially of the axis of the coupling element 126 but will have lines adjacent the opposite ends thereof which pass on opposite sides of that axis.

The passage 140 through the coupling element 126 accommodates the left-hand end of the elongated hollow shaft 68; and that left-hand end abuts the shoulder 142. A threaded socket 144 is provided in the hub of the coupling element 126; and that socket accommodates a set screw 146. When that set screw is tightened against the outer surface of the elongated hollow shaft 68, the coupling element 126 will rotate with that elongated, hollow shaft.

As shown particularly by FIGS. 1–3, the interrupted cylindrical surface which is defined by the outer surfaces of the fingers 84, 88 and 92 of the coupling element 78 has the same diameter as the interrupted cylindrical surface which is defined by the outer surfaces of the fingers 100, 104 and 108 of the coupling element 96. The fingers 84, 88 and 92 of the coupling element 78 are dimensioned to extend into the spaces between the fingers 100, 104 and 108 of the coupling element 96, and vice versa. When those fingers are so interfitted, the generally-helical surfaces 86 and 102 will be in engagement, the generally-helical surfaces 90 and 106 will be in engagement, and the generally-helical surfaces 94 and 110 will be in engagement.

The interrupted cylindrical surface which is defined by the outer surfaces of the fingers 114, 118 and 122 of the couplng element 96 has the same diameter as the interrupted cylindrical surface which is defined by the outer surfaces of the fingers 128, 132 and 136 of the coupling element 126. The fingers 114, 118 and 122 of the coupling element 96 are dimensioned to extend into the spaces between the fingers 128, 132 and 136 of the coupling element 126, and vice versa. When those fingers are so interfitted, the generally-helical surfaces 116 and 130 will be in engagement, the generally-helical surfaces 120 and 134 will be in engagement, and the generally-helical surfaces 124 and 138 will be in engagement.

A helical compression spring 148 has the right-hand end thereof disposed within the left-hand end of the elongated, hollow shaft 68; and it has the left-hand end thereof disposed within socket 112 in the coupling element 96. The outer diameter of that helical compression spring is small enough to permit the turns of that helical compression spring to move freely within that elongated, hollow shaft. The numeral 150 generally denotes an adjusting member which has the form of an elongated rod that has a reduced-diameter left-hand end 156. A thread 152 is formed on the right-hand end of that adjusting member; and a diametrically-extending screw driver-receiving slot 154 is formed in that right-hand end. The adjusting member 150 is disposed within the elongated, hollow shaft 68, and the reduced-diameter left-hand end of that adjusting member is telescoped within the right-hand end of the helical compression spring 148. The thread 152 on that adjusting member mates with the internal thread 77 of the elongated, hollow shaft 68; and rotation of that adjusting member relative to that elongated, hollow shaft will enable the thread 152 and the internal thread 77 to enforce axial displacement of that adjusting member relative to that elongated, hollow shaft.

The coupling elements 78, 96 and 126 and the helical compression spring 148 coact to constitute a torque transmitting, torque-sensing coupling. In use, that torque-transmitting, torque-sensing coupling will have the recess 82 in the coupling element 78 telescoped over the tongue 32 on the end of the shaft 31, as shown by FIG. 2; and it will have the axis of the elongated, hollow shaft 68 precisely coaxial with the axis of the shaft 31.

When the motor, not shown, is energized, it will act through the belt 76 and the pulley 72 to rotate the elongated, hollow shaft 68 and the coupling element 126 in the clockwise direction, as that elongated, hollow shaft is viewed from its right-hand end in FIGS. 1 and 2. The generally-helical driving surfaces 130, 134 and 138 of coupling element 126 will apply forces to the generally-helical driven surfaces 116, 120 and 124 of coupling element 96, and those forces will cause that coupling element to rotate in the same direction. The generally-helical driving surfaces 102, 106 and 110 of coupling element 96 will apply circumferentially-directed forces to the generally-helical driving surfaces 86, 90 and 94 of the coupling element 78; and those forces will cause that coupling element to rotate in the same direction in which elongated shaft 68, coupling element 126 and coupling element 96 are rotating. The recess 82 of coupling element 78 will force the tongue 32 of the shaft 31, and hence also will force that shaft, to rotate in the clockwise direction, as that shaft is viewed from its right-hand end in FIG. 2. In this way, the motor causes the shaft 31, and the agitator 30 thereon, to rotate within the container 10.

The inclinations of the generally-helical driving surfaces 130, 134 and 138 on the couplng element 126 cause those generally-helical driving surfaces to respond to the rotation of that coupling element to apply forces to the generally-helical driven surfaces 116, 120 and 124 on the coupling element 96 which urge the latter coupling element to move to the right in FIGS. 1–3. The inclinations of the generally-helical driven surfaces 86, 90 and 94 on the coupling element 78 cause those generally-helical driven surfaces to apply reaction forces to the generally-helical driving surfaces 102, 106 and 110 on the coupling element 96 which urge the latter coupling element to move to the right in FIGS. 1–3. However, as long as the viscosity of the contents of the container 10 is low, the compressive forces within the helical compression spring 148 will be able to maintain the coupling element 96 in the initial position shown by FIG. 2. Only after the viscosity of those contents has increased to the point where the rotation resistance of agitator 30, and hence of shaft 31 and of coupling element 78, have materially increased will the compressive forces within the helical compression spring 148 be overcome to permit the coupling element 96 to be moved to the right.

As long as the viscosity of the contents of the container 10 is low, the helical compression spring 148 will cause the fingers 100, 104 and 108 on the coupling element 96 to extend further into the spaces between the fingers 84, 88 and 92 of the coupling element 78 than the fingers 114, 118 and 122 on the former coupling element extend into the spaces between the fingers 128, 132 and 136 on the coupling element 126. In one preferred embodiment of the torque-transmitting, torque-sensing system of FIGS. 1-5, the left-hand ends of the fingers 100, 104 and 108 are, whenever the viscosity of the contents of container 10 is low, spaced about one-eighth of an inch to the right of a plane defined by the left-hand ends of the fingers 84, 88 and 92 on the coupling element 78, and the right-hand ends of the fingers 114, 118 and 122 are spaced about three-sixteenths of an inch to the left of a plane defined by the right-hand ends of the fingers 128, 132 and 136 on the coupling element 126. At such time, the fingers 128, 132 and 136 on the coupling element 126 extend far enough into the spaces between the fingers 114, 118 and 122 on the coupling element 96 to enable the former coupling element to provide positive driving of the latter coupling element; and the fingers 100, 104 and 108 on the latter coupling element extend far enough into the spaces between the fingers 84, 88 and 92 on the coupling element 78 to provide positive driving of that last-mentioned coupling element. As the contents of the container 10 tend to freeze, in response to the absorption of heat therefrom by the refrigerant which passes through the coil 15, the viscosity of those contents will increase. The rotation resistance of agitator 30, and hence of shaft 31 and of coupling element 78, will increase as the viscosity of the contents of that container increases. To enable the agitator 30 to keep rotating, the generally-helical driving surfaces 102, 106 and 110 on the coupling element 96 must apply larger forces to the generally-helical driven surfaces 86, 90 and 94 on the coupling element 78. Those larger forces will coact with the inclinations of the generally-helical driven surfaces 86, 90 and 94, relative to the axes of the coupling elements 78 and 96, to cause the latter coupling element to shift to the right. When the viscosity of the contents of the container 10 reaches a predetermined value, the helical compression spring 148 will yield and permit the coupling element 96 to shift to the right in FIGS. 1-3; and, thereupon, the right-hand face of the annular, flange-like portion 98 will move the actuating arm 22 of switch 21 to the right. The resulting opening of that switch will, either directly or through a suitable relay, halt the supplying of refrigerant to the coil 15. The distance through which the coupling element 96 must shift to the right in FIGS. 1-3, to cause the switch 21 to open, will vary with each different refrigerated container 10. Usually that distance is between one-sixteenth and three-sixteenths of an inch; and the actuating arm 22 of that switch will be set to respond to whatever shift is desired. The fingers on the coupling elements 78, 96, and 126 are long enough to remain in engagement with each other during any such shifting.

The generally-helical driving surfaces 130, 134 and 138 on coupling element 126 have surface-to-surface engagements with the generally-helical driven surfaces 116, 120 and 124 on the coupling element 96, whether the latter coupling element is in the initial position of FIG. 2, is in the shifted position of FIG. 3, or is in any intermediate position. Similarly, the generally-helical driving surfaces 102, 106 and 110 on the coupling element 96 have surface-to-surface engagements with the generally-helical driven surfaces 86, 90 and 94 on the coupling element 78, whether the former coupling element is in the initial position of FIG. 2, is in the shifted position of FIG. 3, or is in any intermediate position. Those surface-to-surface engagements are important in minimizing the wearing of the various generally-helical surfaces 86, 90, 94, 102, 106, 110, 116, 120, 124, 130, 134 and 138. The generally-helical configurations of those surfaces enable those generally-helical surfaces to provide centering forces which tend to hold the coupling element 96 concentric with the coupling elements 78 and 126. The helical compression spring 148 also provides centering forces which tend to hold the coupling element 96 concentric with the coupling elements 78 and 126. As a result, the coupling element 98 will rotate concentrically with the coupling elements 78 and 126 even though it is able to move axially relative to each of those coupling elements.

The motor, not shown, and the belt 76 and the pulley 72, wwill continue to rotate the hollow, elongated shaft 68 and the coupling elements 126, 96 and 78, and the coupling element 96 will remain in the shifted position of FIG. 3, as long as the viscosity of the contents of the container 10 is high. Consequently, no further refrigerant will flow through the coil 15 as long as that viscosity is high. However, as the contents of the container 10 become less cold, the viscosity thereof will decrease to the point where the rotation resistance of the agitator 30, and hence of shaft 31 and of coupling element 78, will decrease sufficiently to enable the helical compression spring 148 to shift the coupling element 96 back toward the initial position of FIG. 2. When that helical compression spring moves the coupling element 94 far enough to the left in FIGS. 1-3 to enable the contacts of the switch 21 to re-close, refrigerant will again pass through the coil 15 to absorb heat from the contents of container 10.

It thus will be apparent that the torque-transmitting, torque-sensing system of FIG. 1-5 is able to transmit torque from the shaft 68 to the shaft 31 while sensing the value of that transmitted torque. That system will, whenever the rotation resistance of the shaft 31 reaches a predetermined value, cause the coupling element 96 to shift to the right and move the switch-actuating arm 22; thereby producing an electrical change in response to a mechanically-sensed change in the value of the transmitted torque. The magnitude of the rotation resistance which must develop before the coupling element 96 can be caused to shift far enough to move the switch-actuating arm 22 is determined by the setting of the adjusting member 150 within the elongated, hollow shaft 68. That setting is quickly and easily adjusted; and hence it should be apparent that the torque-transmitting, torque-sensing system is easily installed and readied for operation.

Referring particularly to FIGS. 6-10, the numeral 160 denotes a shaft which is similar to, and which performs the same functions as, the shaft 31 in FIGS. 1-5. A rectangular tongue 162 on the right-hand end of that shaft is dimensioned to telescope into a rectangular recess 166 in the left-hand end of a coupling element 164 which has the form of a cylindrical rod. That recess will coact with that tongue to enable rotation of that coupling element to enforce corresponding rotation of that shaft. A recess 168 of circular cross section is provided in the right-hand end of the coupling element 164; and the recesses 168 and 166 are coaxial. A cylindrical passage 170 extends diametrically through the coupling element 164; and that passage accommodates an elongated cylindrical pin 172 which has reduced-diameter ends 174. The inner race of an anti-friction bearing 176 is secured in position on one of those reduced-diameter ends, and the inner race of an anti-friction bearing 178 is secured in position on the other of those reduced-diameter ends.

Figure 6:
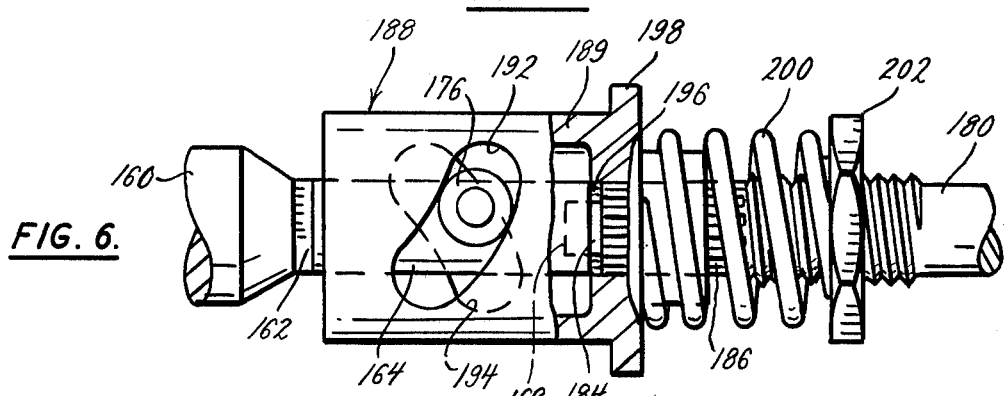
FIG. 6 is a partially-sectioned view of a second preferred embodiment of torque-transmitting, torque-sensing system provided by the present invention.
Figure 7:
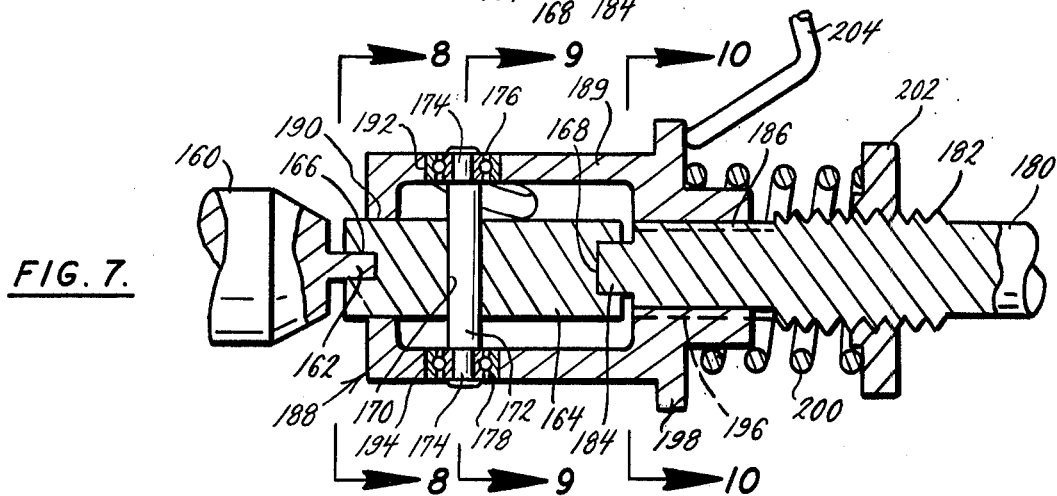
FIG. 7 is a sectional view, through the torque-transmitting, torque-sensing system of FIG. 6, and it is taken along the plane indicated by the line 7—7 in FIG. 6.
Figures 8, 9, 10:
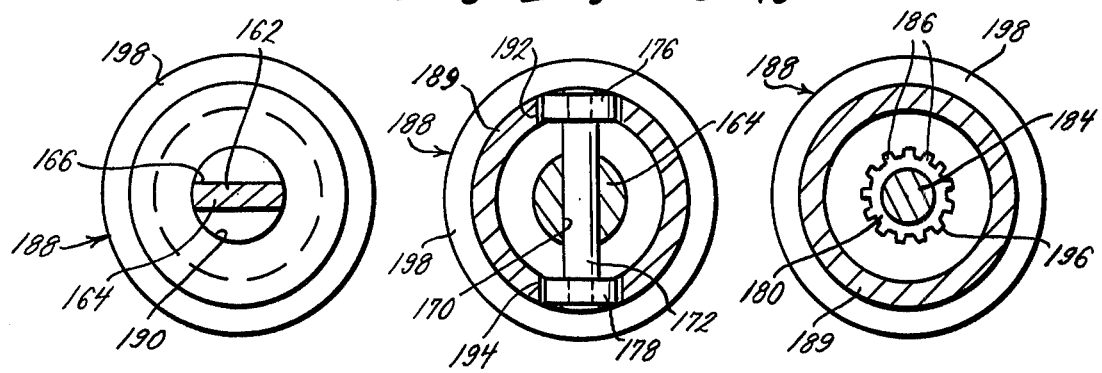
FIG. 8 is another sectional view through the torque-transmitting, torque-sensing system of FIG. 6, and it is taken along the plane indicated by the line 8—8 in FIG. 7.
FIG. 9 is a further sectional view through the torque-transmitting, torque-sensing system of FIG. 6, and it is taken along the plane indicated by the line 9—9 in FIG. 7.
FIG. 10 is yet another sectional view through the torque-transmitting, torque-sensing system of FIG. 6, and it is taken along the plane indicated by the line 10—10 in FIG. 7.

The numeral 180 denotes a shaft with splines 186 on the left-hand end thereof; and a screw thread 182 is disposed to the right of those splines. A projection 184, of circular cross section, projects to the left beyond the splines 186, as shown by FIG. 7. A shouldered nut 202 is threaded onto, and can be set at any desired position along the length of, the screw thread 182. The shaft 180 will preferably be mounted in bearings held by bearing blocks that are similar to the bearing blocks 44 and 60. The projection 184 extends into the recess 168 in the right-hand of the coupling element 164 to support that right-hand end, all as shown by FIGS. 6 and 7.

The numeral 188 generally denotes a coupling element which has a drum-like portion 189 with a circular opening 190 in the left-hand end wall thereof; and that opening accommodates the left-hand end of the coupling element 164. That opening is large enough to permit ready relative rotation of the coupling elements 164 and 188; but it is so small that it could hold the left-ends of those coupling elements concentric with each other. An internally-splined passage 196 projects to the right from the right-hand end of the drum-like portion 189 of the coupling element 188; and that internally-splined passage is concentric with the opening 190. An annular shoulder 198 extends outwardly from the internally splined passage 196; and that annular shoulder projects outwardly beyond the outer surface of the drum-like portion 189. A generally-helical slot 192 is formed in the cylindrical wall of the drum-like portion of the coupling element 188; and that slot is dimensioned to accommodate the outer race of the anti-friction bearing 176. A similar generally-helical slot 194 also is formed in that cylindrical wall, and that slot is dimensioned to accommodate the outer race of the anti-friction bearing 178. The geometric centers of the generally-helical slots 192 and 194 are displaced circumferentially of the cylindrical wall of the drum-like portion 189 by 180°.

The numeral 200 denotes a helical compression spring which has one end thereof teleescoped over the internally-splined passage 196 to bear against the inner portion of the annular shoulder 198. The other end of that helical compression spring is telescoped over part of the screw thread 182 on the shaft 180 and bears against the nut 202. That helical compression spring biases the coupling element 188 for axial movement to the left relative to the coupling element 164.

The numeral 204 denotes a switch-actuating arm which is comparable to, and which performs the functions of, the switch-actuating arm 22 in FIG. 1. The switch-actuating arm 204 will permit closing of the contacts of a switch, not shown, whenever the coupling element 188 is in its initial position which is shown by FIG. 6. That switch-actuating arm will effect opening of those contacts whenever that coupling element is in its shifted position which is shown by FIG. 7. That switch can be identical to the switch 21 in FIG. 1. The coupling element 188 preferably will be made from a tough plastic material that has a smooth surface.

In using the torque-transmitting, torque-sensing coupling shown by FIGS. 6–10, the recess 166 in the left-hand end of the coupling element 164 will be telescoped over the tongue 162 on the right-hand end of the shat 160. Thereupon, the nut 202 will be adjusted on the screw thread 182 on shaft 180 to provide the desired value of compressive force within the helical compression spring 200. That compressive force will, whenever the rotation resistance of the shaft 160 is small, displace the left-hand ends of the generally-helical slots 192 and 194 about five-sexteenths of an inch away from the anti-friction bearings 176 and 178. The splines 186 on the shaft 180 and the internally-splined passage 196 of the coupling element 188 are long enough to permit such displacement and yet continue to force that coupling element to rotate with that shaft. When those left-hand ends of those generally-helical slots are so displaced, the switch-actuating arm will be in switch-closing position.

A motor, not shown, will be suitably connected to the shaft 180 to rotate that shaft in the clockwise direction, as that shaft is viewed from the right in FIGS. 6 and 7. The splines 186 and the splined passageway 196 will force the coupling element 188 to rotate with that shaft; and the generally-helical slots 192 and 194, in the cylindrical surface of the drum-shaped portion 189 of that coupling element, will act through the anti-friction bearings 176 and 178 and the cylindrical pin 172 to force the coupling element 164 to rotate. The rectangular recess 166 in the latter coupling element will coact with the rectangular tongue 162 on the shaft 160 to rotate that shaft in the clockwise direction, as that shaft is viewed from the right in FIGS. 6 and 7. Initially, the compressive force within the helical compression spring 200 will hold the coupling element 188 in the initial position shown by FIG. 6; and hence, initially, the switch-actuating arm 204 will be in switch-closing position.

Whenever the rotation resistance of the shaft 160 increases materially, the generally-helical slots 192 and 194 will coact with the anti-friction bearings 176 and 178 and with the cylindrical pin 172 to tend to cause the coupling element 188 to shift toward the position shown by FIG. 7. The helical compression spring 200 will resist shifting of that coupling element toward that position; but that helical compression spring will yield to permit such shifting if the rotation resistance of shaft 160, and hence of coupling element 164, increases to a predetermined value. If the coupling element 188 reaches the position of FIG. 7, the annular collar 198 will move the switch-actuating arm 204 to switch-opening position.

Where the shaft 160 is the shaft of a container in which carbonated water and syrup are to be converted to an icy form, the opening of the switch, as the coupling element 188 shifts to the position shown by FIG. 7, will halt further flow of refrigerant to the coil of that container. The shaft 180 will continue to act through the coupling elements 188 and 164 to rotate the shaft 160, and the former coupling element will remain in the shifted position of FIG. 7 as long as the rotation resistance of the shaft 160 is high. However, in the absence of further flow of refrigerant to the coil of the container, the temperature of the icy mixture of syrup and carbonated water will increase the viscosity of that mixture will decrease. Thereupon, the compressive forces within the helical compression spring 200 will start to shift the coupling element 188 to the left in FIG. 7. If that coupling element shifts far enough to the left to enable the switch-actuating arm 204 to permit the switch to re-close, further refrigerant will flow through the coil around the container and thereby absorb further heat from the mixture of syrup and carbonated water. It thus will be apparent that the torque-transmitting, torque-sensing coupling of FIGS. 6–10 is able to transmit torque from the shaft 180 to the shaft 160 while sensing the value of that transmitted torque. Further, that torque-transmitting, torque-sensing coupling will, whenever the rotation resistance of the shaft 160 reaches a predetermined value, cause the coupling element 188 to shift to the right and move the switch-actuating arm 204; thereby producing an electrical change in response to a mechanically-sensed change in the value of the transmitted torque. The magnitude of the rotation resistance which must develop before the coupling element 188 can be caused to shift far enough to move the switch-actuating arm 204 is determined by the setting of the nut 202 on the screw thread 182 on shaft 180. That setting is quickly and easily adjusted; and hence it should be apparent that the torque-transmitting, torque-sensing coupling of FIGS. 6–10 is easily installed and readied for operation.

The coupling element 188 will rotate a few degrees relative to the coupling element 164 as the former coupling element shifts axially relative to the shaft 180. The splines 186 and the splined passageway 196 will hold those coupling elements coaxial during such rotation and shifting; and the anti-friction bearings 176 and 178 will minimize wearing of the surfaces of the generally-helical slots 192 and 194. The cylindrical projection 184 on the left-hand end of the shaft 180 will freely turn within the cylindrical recess 168 in the right-hand end of the coupling element 164; and the circular opening 190 in the end wall of the drum-like portion 189 of the coupling element 188 will turn freely relative to the coupling element 164. Consequently, the rotation and the axial shifting of the coupling element 188 relative to the coupling element 164 is accomplished with minimal wear and frictional resistance.

The torque-transmitting torque-sensing coupling of FIGS. 6–10 has the coupling element 188 thereof rotatable with, but shiftable axially relative to, the driving shaft 180. However, if desired, that coupling element could be made so it was rotatable with, but shiftable axially relative to, the driven shaft 160.

The inclinations of the generally-helical slots 192 and 194 cause the coupling element 188 to respond to increased rotation resistance of the shaft 160, and hence of the coupling element 164, to shift to the right in FIG. 6. By reversing the inclinations of those generally-helical slots, it would be possible to cause the coupling element 188 to respond to increased rotation resistance of the shaft 160, and hence of the coupling element 164, to shift to the left in FIGS. 6 and 7. In such event, a switch would be used which would open its contacts as the switch-actuating arm 204 moved to the left.

Referring particularly to FIGS. 11 and 12, the numeral 210 denotes a generally-rectangular, opentype frame to which an electric motor 212 is suitably secured. Threaded studs 214, 216, 218, 220, 222, 224, 226 and 228 are secured to, and extend upwardly from, the frame 210. A bearing block 230 has elongated slots, not shown, therein which are telescoped over the threaded studs 214 and 216; and the slot-defining portions of that bearing block are underlain by nuts 232 which are threaded onto those two studs. Nuts 234 overlie those slot-defining portions to help fix the horizontal and vertical portion of that bearing block relative to the frame 210. A bearing block 236 has elongated slots, not shown, therein which are telescoped over the threaded studs 218 and 220; and the slot-defining portions of that bearing block are underlain by nuts, not shown, which are threaded onto those two studs. Nuts 238 overlie those slot-defining portions to help fix the horizontal and vertical position of that bearing block relative to the frame 210. The numeral 240 denotes a bearing block with elongated slots, not shown, therein which are telescoped over the threaded studs 222 and 224; and the slot-defining portions of that bearing block are underlain by nuts 242 which are threaded onto those two studs. Nuts 244 overlie those slot-defining portions to help fix the horizontal and vertical position of that bearing block relative to the frame 214. The numeral 246 denotes a bearing block with elongated slots, not shown, therein which are telescoped over the threaded studs 226 and 228; and the slot-defining portions of that bearing block are underlain by nuts, not shown, which are threaded onto those two studs. Nuts 248 overlie those slot-defining portions to help fix the horizontal and vertical position of that bearing block relative to the frame 210. The bearing blocks 230, 236, 240 and 246 preferably will be identical to the bearing blocks 44 and 60 of FIGS. 1 and 2.

The numeral 250 denotes a shaft which is rotatably supported by a bearing, not shown, within the bearing block 230; and the numeral 254 denotes a shaft which is rotatably supported by a bearing, not shown, within the bearing block 236. The shafts 250 and 254 will be set in precise coaxial relationship; and a torque-transmitting, torque-sensing coupling 252 will enable the shaft 250 to drive the shaft 254. That torque-transmitting, torque-sensing coupling is shown as being identical to the torque-transmitting, torque-sensing coupling of FIGS. 6–10. A pulley 256 is mounted on, and rotates, the shaft 250; and a pulley 258 is mounted on, and is rotated by, the shaft 254.

The numeral 260 denotes a shaft which is rotatably supported by a bearing, not shown, within the bearing block 240; and the numeral 264 denotes a shaft which is rotatably held by a bearing, not shown, within the bearing block 246. Those shafts will be set in precise coaxial relationship; and a torque-transmitting, torque-sensing coupling 262 will enable the shaft 260 to drive the shaft 264. That torque-transmitting, torque-sensing coupling is shown as being identical to the torque-transmitting, torque-sensing coupling of FIGS. 6–10. A pulley 266 is mounted on, and rotates, the shaft 260; and a pulley 268 is mounted on, and is rotated by, the shaft 264. Pulleys 270 and 272 are mounted on the output shaft of the motor 212; and the pulley 270 is aligned with the pulley 256, while the pulley 272 is aligned with the pulley 266.

The numeral 274 denotes a pulley which is mounted on, and rotates, the shaft of a refrigerated container 276. That refrigerated container is shown by dotted lines in FIGS. 11 and 12; and it overlies the torque-transmitting, torque-sensing coupling 252 and portions of the shafts 250 and 254. The numeral 278 denotes a pulley which is mounted on, and rotates, the shaft of a refrigerated container 280. That refrigerated container is shown by dotted lines in FIGS. 11 and 12; and it overlies the torque-transmitting, torque-sensing coupling 262 and portions of the shafts 260 and 264. The refrigerated containers 276 and 280 preferably are longer than, but otherwise are identical to, the refrigerated container 10 in FIG. 1. The pulley 274 is aligned with the pulley 258; and the pulley 278 is aligned with the pulley 268. A flexible belt 282 encircle the pulleys 270 and 256 to enable the former to drive the latter. A flexible belt 284 encircles the pulleys 272 and 266 to enable the former to drive the latter. A flexible belt 286 encircles the pulleys 258 and 274 to enable the former to drive the latter; and a flexible belt 288 encircles the pulleys 268 and 278 to enable the former to rotate the latter.

The motor 212 will rotate the shafts 250 and 260 in the same direction and at the same rate of speed. The torque-transmitting, torque-sensing coupling 252 will respond to the rotation of shaft 250 to effect rotation of the pulley 274 of the refrigerated container 176; and it will respond to a material increase in the viscosity of the contents of that refrigerated container to cause a switch, that is similar to the switch 21 of FIG. 1, to open a circuit, and thereby halt further flow of refrigerant through the coil of that refrigerated container. The torque-transmitting, torque-sensing coupling 262 will respond to rotation of shaft 260 to effect rotation of the pulley 278 of the refrigerated container 280; and it will respond to a material increase in the viscosity of the contents of that refrigerated container to cause a further switch, that also is similar to the switch 21 of FIG. 1, to open a circuit, and thereby halt further flow of refrigerant through the coil of that refrigerated container. In this way, the torque-transmitting, torque-sensing couplings 252 and 262 enable the motor 212 to provide continuous rotation of the pulleys 274 and 278, but to provide selective flow of refrigerant through the coils of the refrigerated containers 276 and 280.

It should be noted that the torque-transmitting, torque-sensing coupling 252 is positioned below, rather than in axial alignment with, the refrigerated container 276. Similaly, the torque-transmitting, torque-sensing coupling 262 is positioned below, rather than in axial alignment with, the refrigerated container 280. As a result, if the refrigerated container 276 of FIGS. 11 and 12 was the same size as the refrigerated container 10 of FIG. 1, the former refrigerated container and the drive therefor would require much less axial space than would the latter refrigerated container and the drive therefor. If, on the other hand, the refrigerated container 276 was to be mounted in a space having an axial dimension equal to that of the space in which the refrigerated container 10 was to be mounted, the former refrigerated container could be made considerably longer than the latter refrigerated container.

Referring particularly to FIGS. 13–16, the numeral 290 generally denotes a coupling element which has six teeth 292 that project axially from a generally-circular end wall of that coupling element. Each of those teeth has a generally-helical surface 294 thereon and has a lubricant-holding recess 296 at the root of that generally-helical surface. The other surface of each tooth 292 is essentially flat; and it defines a plane which extends chord-like of the generally-circular end wall of that coupling element. A shaft 298 extends into the hub-like portion of the coupling element 290; and that shaft will be driven by that hub-like portion.

The numeral 300 generally denotes a coupling element which is intended to mate with, and to drive, the coupling element 290. The former coupling element has six teeth 302 that project axially from a generally-circular end wall of that coupling element. Each of those teeth has a generally-helical surface 304 thereon and has a lubricant-holding recess 306 at the root of that generally-helical surface. The other surface of each tooth 302 is generally flat; and it defines a plane which extends chord-like of the generally-circular end wall of that coupling element.

The tip of one of the teeth 302 of the coupling element 300 is denoted by the numeral 308 in FIGS. 14 and 15; and a dotted line 309 in FIG. 14 extends inwardly of, and is in alignment with, that tip. That dotted line passes to one side of the geometric center of the coupling element 300. A dotted line 311 in FIG. 14 extends inwardly of, and is in alignment with, the root of the generally-helical surface 304 which extends upwardly and to the right in FIG. 15 from the tip 308. That dotted line passes to the opposite side of the geometric center of the coupling element 300. This means that the generally-helical surface 304, which extends upwardly and to the right in FIG. 15 from the tip 308, has the upper end thereof defining a line which passes to one side of the geometric center of the coupling element 300 and has the lower end thereof defining a line which passes to the opposite side of that geometric center; and hence has an intermediate portion thereof defining a line which extends radially through that geometric center. Each of the generally-helical surfaces 304 of the coupling element 300 will have the same size and configuration; and hence each of them will define a line which passes to one side of the geometric center of that coupling element, will define a second line which passes to the opposite side of that geometric center, and will define an intermediate line which extends radially through that geometric center.

The teeth 292 on the coupling element 290 are identical in size and configuration to the teeth 302 on the coupling element 300. Consequently, each of the teeth 292 will define a line which passes to one side of the geometric center of that coupling element, will define a second line which passes to the opposite side of that geometric center, and will define an intermediate line which extends radially through that geometric center. Such dispositions of the lines at the tips, roots and intermediate portions of the teeth 292 and 302 are desirable, because they help minimize the wear of the generally-helical surfaces 304 and 294 as the coupling element 300 drives the coupling element 290. Further, those dispositions help provide a centering action which tends to cause the coupling elements 300 and 290 to remain precisely coaxial as they rotate, despite relative axial movement between them.

The numeral 310 denotes a shaft on which the coupling element 300 is mounted. If that coupling element is to be fixedly secured to that shaft, the bearings and the drive for that shaft must permit that shaft to move axially, whenever that coupling element moves axially relative to the coupling element 290. If the coupling element 300 is to be mounted so it rotates with, but can move axially relative to, the shaft 310—as by having internal splines, not shown, which mate with splines, not shown, on that shaft—the bearings and drive for that shaft can hold that shaft against axial movement. The numeral 312 denotes a nut which is mounted on a threaded portion of the shaft 310, the numeral 314 denotes a washer which encircles the shaft 310 and which bears against the nut 312, and the numeral 316 denote a helical compression spring which has one end thereof bearing against the washer 314. The washer 314 and the helical compression spring 316 are shown in the positions which they will occupy if the coupling element 300 is to be fixedly secured to, and to axially move, the shaft 310. Where the coupling element 300 is splined to the shaft 310, the washer 314 and the helical compression spring 316 will be disposed at the left-hand side of the nut 312.

The shaft 310 will rotate the coupling element 300; and that coupling element will rotate the coupling element 290, and hence the shaft 298. When the rotation resistance of the shaft 298 increases materially, the generally-helical surfaces 294 of the teeth 292 on the coupling element 290 will apply reaction forces to the generally-helical surfaces 304 of the teeth 302 on the coupling element 300 which will force the latter coupling element to shift to the right in FIG. 13. That shifting will suitably cause a switch, like the switch 21 of FIG. 1, to open a circuit. That switch will remain open until the rotation resistance of the shaft 298 decreases to its initial value; and, thereupon, the helical compression spring 316 will cause the coupling element 300 to move back into the intimate engagement with coupling 290 which is shown in FIG. 13.

It will be noted that all of the movable coupling elements provided by the present invention have small masses. Further, it will be noted that the movable coupling elements of FIGS. 1–12 shift axially relative to, rather than with, the shafts which cause them to rotate. As a result, the inertial forces which must be overcome to move any of the movable coupling elements of FIGS. 1–12 are desirably small.

Whereas the drawing and accompanying description have shown two preferred embodiments of the invention, it should be apparent to those skilled in the art that various changes may be made in the form of the invention without affecting the scope thereof.

What we claim is:

1. A torque-transmitting, torque-sensing control, which is usable to transmit torque between two rotatable members that are held against appreciable axial movement, and which comprises a first coupling element that is connectable to one of said rotatable members to rotate with, while not experiencing appreciable movement relative to, said one rotatable member, a second coupling element that rotates when said other rotatable member rotates but that can experience appreciable movement relative to said other rotatable member, a surface on said first coupling element that is engageable with a confronting surface on said second coupling element to force said coupling elements to rotate together while permitting appreciable relative movement between said coupling elements and also between said second coupling element and said other rotatable member, means urging said coupling elements for relative movement in one direction but yielding to permit relative movement of said coupling elements in the opposite direction, said means continuously holding said surfaces on said coupling elements in rotation-inducing engagement with each other, said surfaces on said coupling elements responding to a predetermined increase in rotation resistance of one of said coupling elements to cause relative movement of said coupling elements in said opposite direction, said means thereafter responding to a predetermined decrease in said rotation resistance of said one coupling element to cause relative movement of said coupling elements in said one direction, and a position sensor which senses said relative movement of said coupling elements.

2. A torque-transmitting, torque-sensing control as claimed in claim 1 wherein said relative movement of said coupling elements is axial relative to said one rotatable member, and wherein said surfaces on said coupling elements have portions thereof which are angularly displaced from the axis of said one rotatable member.

3. A torque-transmitting, torque-sensing control as claimed in claim 1 wherein said surface on said first coupling element has circumferentially-spaced portions on circumferentially-spaced fingers which project from said first coupling element, wherein said surface on said second coupling element has circumferentially-spaced portions on circumferentially-spaced fingers which project from said second coupling element, wherein said circumferentially-spaced fingers which project from said first coupling element extend into spaces between said circumferentially-spaced fingers which project from said second coupling element, and wherein said circumferentially-spaced fingers which project from said second coupling element extend into spaces between said circumferentially-spaced fingers which project from said first coupling element.

4. A torque-transmitting, torque-sensing control as claimed in claim 1 wherein said means includes a resilient element which urges said second coupling element for movement axially in said one direction relative to said first coupling member and relative to said one rotatable member, and wherein said resilient element can yield to permit said second coupling element to move axially in said opposite direction relative to said first coupling member and relative to said one rotatable member.

5. A torque-transmitting, torque-sensing control as claimed in claim 1 wherein said relative movement is axial of said one rotatable member, and wherein said relative movement is shorter, in a direction axial of said one rotatable member, than is either of said surfaces in a direction axial of said one rotatable member.

6. A torque-transmitting, torque-sensing control as claimed in claim 1 wherein said surfaces are generally-helical.

7. A torque-transmitting, torque-sensing control as claimed in claim 1 wherein said surface on said first coupling element has circumferentially-spaced portions on circumferentially-spaced fingers which project from said first coupling element, wherein said surface on said second coupling element has circumferentially-spaced portions on circumferentially-spaced fingers which project from said second coupling element, wherein said circumferentially-spaced fingers which project from said first coupling element extend into spaces between said circumferentially-spaced fingers which project from said second coupling element, wherein said circumferentially-spaced fingers which project from said second coupling element extend into spaces between said circumferentially-spaced fingers which project from said first coupling element, and wherein relative axial movement of said circumferentially-spaced fingers on said coupling elements occurs during said relative movement of said coupling elements.

8. A torque-transmitting, torque-sensing control as claimed in claim 1 wherein said surface on said first coupling element has circumferentially-spaced portions on circumferentially-spaced fingers which project from said first coupling element, wherein said surface on said second coupling element has circumferentially-spaced portions on circumferentially-spaced fingers which project from said second coupling element, wherein said circumferentially-spaced fingers which project from said first coupling element extend into spaces between said circumferentially-spaced fingers which project from said second coupling element, wherein said circumferentially-spaced fingers which project from said second coupling element extend into spaces between said circumferentially-spaced fingers which project from said first coupling element, wherein the outer surfaces of said circumferentially-spaced fingers which project from said first coupling element define an interrupted cylindrical surface, and wherein the outer surfaces of said circumferentially-spaced fingers which project from said second coupling element define an interrupted cylindrical surface.

9. A torque-transmitting, torque-sensing control as claimed in claim 1 wherein said surfaces are generally-helical, and wherein said surfaces coact to resist relative radially-directed shifting of said coupling elements.

10. A torque-transmitting, torque-sensing control as claimed in claim 1 wherein interfacing surfaces on said second coupling element and on the second rotatable member permit relative axial movement between, but enforce simultaneous rotation of, said second coupling element and said second rotatable member.

11. A torque-transmitting, torque-sensing control as claimed in claim 1 wherein a third coupling element interconnects said second coupling element with the second rotatable member, and wherein said second coupling element is movable axially relative to said first and said third coupling elements.

12. A torque-transmitting, torque-sensing control as claimed in claim 1 wherein one of said coupling elements has a hollow portion, and wherein a substantial portion of the other of said coupling elements extends into, but is movable relative to, said hollow portion.

13. A torque-transmitting, torque-sensing control as claimed in claim 1 wherein that coupling element which is movable relative to the other coupling element has a small mass to reduce the inertial forces which must be overcome during the movement of that coupling element.

14. A torque-transmitting, torque-sensing control which is usable to transmit torque between two rotatable members that are held against appreciable axial movement, and which comprises a first coupling element that is connectable to one of said rotatable members to rotate with, while not experiencing appreciable movement relative to, said one rotatable member, a second coupling element that rotates when said other rotatable member rotates but that can experience appreciable movement relative to said other rotatable member, a surface on said first coupling element that is engageable with a confronting surface on said second coupling element to force said coupling elements to rotate together while permitting appreciable relative movement between said coupling elements and also between said second coupling element and said other rotatable member, means urging said coupling elements for relative movement in one direction but yielding to permit relative movement of said coupling elements in the opposite direction, said means continuously holding said surfaces on said coupling elements in rotation-inducing engagement with each other, said surfaces on said coupling elements responding to a predetermined increase in rotation resistance of one of said coupling elements to cause relative movement of said coupling elements in said opposite direction, said means thereafter responding to a predetermined decrease in said rotation resistance of said one coupling element to cause relative movement of said coupling elements in said one direction, a position sensor which senses said relative movement of said coupling elements, said means including a resilient element which urges said second coupling element for movement axially in said one direction relative to said first coupling member and relative to said one rotatable member, said resilient element being yieldable to permit said second coupling element to move axially in said opposite direction relative to said first coupling member and relative to said one rotatable member, an adjustable member that is movable to adjust the force which said resilient element applies to said second coupling element to urge said second coupling element for movement axially in said one direction relative to said first coupling member and relative to said one rotatable member, and said adjustable member being disposed, at least in part, within said one rotatable member.

15. A torque-transmitting, torque-sensing control which is usable to transmit torque between two rotatable members that are held against appreciable axial movement, and which comprises a first coupling element that is connectable to one of said rotatable members to rotate with, while not experiencing appreciable movement relative to, said one rotatable member, a second coupling element that rotates when said other rotatable member rotates but than can experience appreciable movement relative to said other rotatable member, a surface on said first coupling element that is engageable with a confronting surface on said second coupling element to force said coupling elements to rotate together while permitting appreciable relative movement between said coupling elements and also between said second coupling element and said other rotatable member, means urging said coupling elements for relative movement in one direction but yielding to permit relative movement of said coupling elements in the opposite direction, said means continuously holding said surfaces on said coupling elements in rotation-inducing engagement with each other, said surfaces on said coupling elements responding to a predetermined increase in rotation resistance of one of said coupling elements to cause relative movement of said coupling elements in said opposite direction, said means thereafter responding to a predetermined decrease in said rotation resistance of said one coupling element to cause relative movement of said coupling elements in said one direction, a position sensor which senses said relative movement of said coupling elements, said surface on said first coupling element having circumferentially-spaced portions on circumferentially-spaced fingers which project from said first coupling element, said surface on said second coupling element having circumferentially-spaced portions on circumferentially-spaced fingers which project from said second coupling element, said circumferentially-spaced fingers which project from said first coupling element extending into spaces between said circumferentially-spaced fingers which project from said second coupling element, said circumferentially-spaced fingers which project from said second coupling element extending into spaces between said circumferentially-spaced fingers which project from said first coupling element, and said relative movement being shorter than any of said circumferentially-spaced portions of any of said circumferentially-spaced fingers.

16. A torque-transmitting, torque-sensing control which is usable to transmit torque between two rotatable members that are held against appreciable axial movement, and which comprises a first coupling element that is connectable to one of said rotatable members to rotate with, while not experiencing appreciable movement relative to, said one rotatable member, a second coupling element that rotates when said other rotatable member rotates but that can experience appreciable movement relative to said other rotatable member, a surface on said first coupling element that is engageable with a confronting surface on said second coupling element to force said coupling elements to rotate together while permitting appreciable relative movement between said coupling elements and also between said second coupling element and said other rotatable member, means urging said coupling elements for relative movement in one direction but yielding to permit relative movement of said coupling elements in the opposite direction, said means continuously holding said surfaces on said coupling elements in rotation-inducing engagement with each other, said surfaces on said coupling elements responding to a predetermined increase in rotation resistance of one of said coupling elements to cause relative movement of said coupling elements in said opposite direction, said means thereafter responding to a predetermined decrease in said rotation resistance of said one coupling element to cause relative movement of said coupling elements in said one direction, a position sensor which senses said relative movement of said coupling elements, said means including a resilient element which urges said second coupling element for movement axially in said one direction relative to said first coupling member and relative to said one rotatable member, said resilient element being yieldable to permit said second coupling element to move axially in said opposite direction relative to said first coupling member and relative to said one rotatable member, said one rotatable member being a hollow shaft, an adjustable member that is disposed, at least in part, within said one rotatable member, said adjustable member being movable to adjust the force which said resilient element applies to said second coupling element to urge said second coupling element for movement axially in said one direction relative to said first coupling member and relative to said one rotatable member, and said adjustable member being reached through an open end of said one rotatable member.

17. A torque-transmitting, torque-sensing control which is usable to transmit torque between two rotatable members that are held against appreciable axial movement, and which comprises a first coupling element that is connectable to one of said rotatable members to rotate with, while not experiencing appreciable movement relative to, said one rotatable member, a second coupling element that rotates when said other rotatable member rotates but that can experience appreciable movement relative to said other rotatable member, a surface on said first coupling element that is engageable with a confronting surface on said second coupling element to force said coupling elements to rotate together while permitting appreciable relative movement between said coupling elements and also between said second coupling element and said other rotatable member, means urging said coupling elements for relative movement in one direction but yielding to permit relative movement of said coupling elements in the opposite direction, said means continuously holding said surfaces on said coupling elements in rotation-inducing engagement with each other, said surfaces on said coupling elements responding to a predetermined increase in rotation resistance of one of said coupling elements to cause relative movement of said coupling elements in said opposite direction, said means thereafter responding to a predetermined decrease in said rotation resistance of said one coupling element to cause relative movement of said coupling elements in said one direction, a position sensor which senses said relative movement of said coupling elements, said surface on said first coupling element having circumferentially-spaced portions on circumferentially-spaced fingers which project from said first coupling element, said surface on said second coupling element having circumferentially-spaced portions on circumferentially-spaced fingers which project from said second coupling element, said circumferentially-spaced fingers which project from said first coupling element extending into spaces between said circumferentially-spaced fingers which project from said second coupling element, said circumferentially-spaced fingers which project from said second coupling element extending into spaces between said circumferentially-spaced fingers which project from said first coupling element, said circumferentially-spaced portions on said circumferentially-spaced fingers being generally helical, and generally helical movement of said circumferentially-spaced fingers on said coupling elements occurring during said relative movement of said coupling elements.

18. A torque-transmitting, torque-sensing control which is usable to transmit torque between two rotatable members that are held against appreciable axial movement, and which comprises a first coupling element that is connectable to one of said rotatable members to rotate with, while not experiencing appreciable movement relative to, said one rotatable member, a second coupling element that rotates when said other rotatable member rotates but that can experience appreciable movement relative to said other rotatable member, a surface on said first coupling element that is engageable with a confronting surface on said second coupling element to force said coupling elements to rotate together while permitting appreciable relative movement between said coupling elements and also between said second coupling element and said other rotatable member, means urging said coupling elements for relative movement in one direction but yielding to permit relative movement of said coupling elements in the opposite direction, said means continuously holding said surfaces on said coupling elements in rotation-inducing engagement with each other, said surfaces on said coupling elements responding to a predetermined increase in rotation resistance of one of said coupling elements to cause relative movement of said coupling elements in said opposite direction, said means thereafter responding to a predetermined decrease in said rotation resistance of said one coupling element to cause relative movement of said coupling elements in said one direction, a position sensor which senses said relative movement of said coupling elements, said means including a resilient element which urges said second coupling element for movement axially in said one direction relative to said first coupling member and relative to said one rotatable member, said resilient element being yieldable to permit said second coupling element to move axially in said opposite direction relative to said first coupling member and relative to said one rotatable member, and said resilient element resisting relative lateral movement of said coupling elements, whereby said resilient element performs a dual function.

* * * * *